US012719048B2

(12) United States Patent
Baek et al.

(10) Patent No.: US 12,719,048 B2
(45) Date of Patent: Aug. 25, 2026

(54) METHOD OF PREPARING LITHIUM SECONDARY BATTERY AND LITHIUM SECONDARY BATTERY PREPARED THEREBY

(71) Applicant: LG Energy Solution, Ltd., Seoul (KR)

(72) Inventors: So Ra Baek, Daejeon (KR); Hak Yoon Kim, Daejeon (KR); Hyuck Hur, Daejeon (KR); Dong Hwi Kim, Daejeon (KR); Hyeong Il Kim, Daejeon (KR); Seul Ki Chae, Daejeon (KR); Wang Mo Jung, Daejeon (KR); Dong Hun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 648 days.

(21) Appl. No.: 18/027,688

(22) PCT Filed: Oct. 22, 2021

(86) PCT No.: PCT/KR2021/014956

§ 371 (c)(1),
(2) Date: Mar. 22, 2023

(87) PCT Pub. No.: WO2022/114538

PCT Pub. Date: Jun. 2, 2022

(65) Prior Publication Data

US 2023/0387399 A1 Nov. 30, 2023

(30) Foreign Application Priority Data

Nov. 27, 2020 (KR) ........................ 10-2020-0162322

(51) Int. Cl.
*H01M 4/38* (2006.01)
*H01M 4/02* (2006.01)
(Continued)

(52) U.S. Cl.
CPC ......... *H01M 4/386* (2013.01); *H01M 4/0404* (2013.01); *H01M 4/0471* (2013.01);
(Continued)

(58) Field of Classification Search
CPC .. H01M 4/386; H01M 4/0404; H01M 4/0471; H01M 4/525; H01M 4/131;
(Continued)

(56) References Cited

U.S. PATENT DOCUMENTS

2006/0257745 A1 11/2006 Choi et al.
2010/0019208 A1 1/2010 Choi et al.
(Continued)

FOREIGN PATENT DOCUMENTS

CN 108550802 A 9/2018
CN 110459736 A 11/2019
(Continued)

OTHER PUBLICATIONS

International Search Report for Application No. PCT/KR2021/014956 mailed Jan. 27, 2022, pp. 1-3.
(Continued)

*Primary Examiner* — Aiqun Li
(74) *Attorney, Agent, or Firm* — Lerner David LLP

(57) ABSTRACT

A method of preparing a lithium secondary battery includes:
(1) mixing a small particle lithium composite transition metal oxide having an average particle diameter ($D_{50}$) of less than 7 μm with a boron-containing raw material and performing a heat treatment, mixing a large particle lithium composite transition metal oxide having an average particle diameter ($D_{50}$) of 8 μm or more with a cobalt-containing raw material and a boron-containing raw material and performing a heat treatment,
mixing the first positive electrode active material and the second positive electrode active material to prepare a
(Continued)

positive electrode material having a bimodal particle diameter distribution, preparing a positive electrode by coating the positive electrode material on a positive electrode collector, and assembling the positive electrode, a negative electrode including a silicon-based negative electrode active material, and a separator.

12 Claims, 1 Drawing Sheet

(51) Int. Cl.
*H01M 4/04* (2006.01)
*H01M 4/525* (2010.01)
*H01M 10/0525* (2010.01)

(52) U.S. Cl.
CPC ....... *H01M 4/525* (2013.01); *H01M 10/0525* (2013.01); *H01M 2004/021* (2013.01); *H01M 2004/027* (2013.01); *H01M 2004/028* (2013.01)

(58) Field of Classification Search
CPC ...... H01M 4/134; H01M 4/1391; H01M 4/62; H01M 4/36; H01M 4/364; H01M 4/366; H01M 4/38; H01M 4/483; H01M 4/485; H01M 4/505; H01M 4/58; H01M 10/052; H01M 2004/021; H01M 2004/027; H01M 2004/028; Y02E 60/10; Y02P 70/50
See application file for complete search history.

(56) References Cited

U.S. PATENT DOCUMENTS

| | | | |
|---|---|---|---|
| 2015/0162598 | A1 | 6/2015 | Kim et al. |
| 2017/0309898 | A1 | 10/2017 | Hong |
| 2017/0346133 | A1 | 11/2017 | Je et al. |
| 2019/0140264 | A1 | 5/2019 | Hong |
| 2019/0341598 | A1 | 11/2019 | Nam et al. |
| 2020/0067091 | A1 | 2/2020 | Jo et al. |
| 2020/0083524 | A1 | 3/2020 | Baek et al. |
| 2020/0144610 | A1 | 5/2020 | Hong et al. |
| 2020/0335783 | A1 | 10/2020 | Lee et al. |
| 2020/0335787 | A1 | 10/2020 | Chae et al. |
| 2020/0343553 | A1 | 10/2020 | Kim et al. |
| 2020/0381727 | A1 | 12/2020 | Kumakura et al. |
| 2021/0036318 | A1 | 2/2021 | Kim et al. |
| 2021/0328213 | A1 | 10/2021 | Kim et al. |
| 2022/0246928 | A1 | 8/2022 | Jo et al. |
| 2024/0038987 | A1 | 2/2024 | Kim et al. |

FOREIGN PATENT DOCUMENTS

| | | | |
|---|---|---|---|
| CN | 110574194 | A | 12/2019 |
| CN | 110892565 | A | 3/2020 |
| CN | 111316480 | A | 6/2020 |
| CN | 111527630 | A | 8/2020 |
| CN | 111542496 | A | 8/2020 |
| CN | 111630002 | A | 9/2020 |
| CN | 111900359 | A | 11/2020 |
| JP | 3723444 | B2 | 12/2005 |
| JP | 2018505508 | A | 2/2018 |
| JP | 2020072092 | A | 5/2020 |
| JP | 2020514972 | A | 5/2020 |
| JP | 2020091985 | A | 6/2020 |
| JP | 2020525993 | A | 8/2020 |
| JP | 2021508161 | A | 2/2021 |
| KR | 20060091486 | A | 8/2006 |
| KR | 20110063335 | A | 6/2011 |
| KR | 20140018685 | A | 2/2014 |
| KR | 20160075196 | A | 6/2016 |
| KR | 101772737 | B1 | 9/2017 |
| KR | 20190041420 | A | 4/2019 |
| KR | 20190101735 | A | 9/2019 |
| KR | 20200022903 | A | 3/2020 |
| KR | 20200036796 | A | 4/2020 |
| KR | 20200044448 | A | 4/2020 |
| KR | 20200090727 | A | 7/2020 |
| WO | 2019088806 | A1 | 5/2019 |
| WO | 2019164313 | A1 | 8/2019 |

OTHER PUBLICATIONS

Ji, G. et al., "Mitigating the initial capacity loss (ICL) problem in high-capacity lithium ion battery anode materials", Journal of Materials Chemistry, Feb. 16, 2011, pp. 9819-9824, vol. 21, No. 27.

Extended European Search Report for Application No. 21898364.1 dated May 28, 2025. 6 pages.

Search Report dated Dec. 16, 2025 from the Office Action for Chinese Application No. 202180064401.1 issued Dec. 17, 2025, 3 pages.

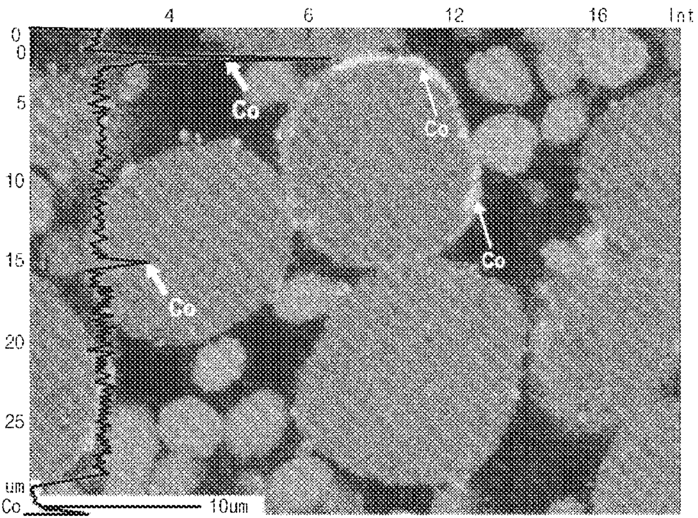
4
6
12
16
Int
0
0
5
10
15
20
25
um
Co
10um
Co
Co
Co
Co

METHOD OF PREPARING LITHIUM SECONDARY BATTERY AND LITHIUM SECONDARY BATTERY PREPARED THEREBY

CROSS-REFERENCE TO RELATED APPLICATIONS

The present application is a national phase entry under U.S.C. § 371 of International Application No. PCT/KR2021/014956 filed on Oct. 22, 2021, which claims priority from Korean Patent Application No. 10-2020-0162322, filed on Nov. 27, 2020, all of which are incorporated by reference herein.

TECHNICAL FIELD

The present invention relates to a method of preparing a lithium secondary battery and a lithium secondary battery prepared thereby.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

A carbon-based material, such as graphite, is mainly used as a negative electrode material of the lithium secondary battery, but, since the carbon-based material has low capacity per unit mass, it is disadvantageous in that it is difficult to prepare a high capacity lithium secondary battery. Accordingly, materials, which form intermetallic compounds with lithium, such as silicon, tin, and oxides thereof, have been developed and used as non-carbon-based negative electrode materials exhibiting higher capacity than the carbon-based material, but these negative electrode materials have a limitation in that an irreversible capacity loss during initial charge and discharge is large.

In order to address this limitation, a method for overcoming the irreversible capacity loss of a negative electrode by using a material, which may provide a lithium ion source or storage and exhibits electrochemical activity after the first cycle so as not to degrade overall performance of the battery, as a positive electrode material has been studied and proposed. Specifically, there is a method of using a lithium nickel-based oxide, such as $Li_2NiO_2$, in a positive electrode as a sacrificial positive electrode material or an overdischarge inhibitor.

However, since most lithium nickel-based oxides have limitations in that they are expensive and generate a lot of lithium by-products to increase an amount of gas generated, a method to replace them is required.

DISCLOSURE OF THE INVENTION

Technical Problem

An aspect of the present invention provides a lithium secondary battery which may eventually reduce only lithium consumption without degradation of resistance and life characteristics by introducing a positive electrode material that may compensate for a problem caused by a negative electrode material having a high irreversible capacity loss.

Technical Solution

According to an aspect of the present invention, there is provided a method of preparing a lithium secondary battery which includes steps of:

(1) preparing a first positive electrode active material by mixing a small particle lithium composite transition metal oxide having an average particle diameter ($D_{50}$) of less than 7 μm with a boron-containing raw material and performing a heat treatment;

(2) preparing a second positive electrode active material by mixing a large particle lithium composite transition metal oxide having an average particle diameter ($D_{50}$) of 8 μm or more with a cobalt-containing raw material and a boron-containing raw material and performing a heat treatment;

(3) mixing the first positive electrode active material and the second positive electrode active material to prepare a positive electrode material having a bimodal particle diameter distribution;

(4) preparing a positive electrode by coating the positive electrode material on a positive electrode collector; and (5) assembling the positive electrode, a negative electrode including a silicon-based negative electrode active material, and a separator.

According to another aspect of the present invention, there is provided a lithium secondary battery which includes a positive electrode including a positive electrode material having a bimodal particle diameter distribution, a negative electrode including a silicon-based negative electrode active material, and a separator, wherein the positive electrode material includes a first positive electrode active material and a second positive electrode active material, wherein the first positive electrode active material includes a small particle lithium composite transition metal oxide having an average particle diameter ($D_{50}$) of less than 7 μm, and a boron-containing coating layer formed on the small particle lithium composite transition metal oxide, and the second positive electrode active material includes a large particle lithium composite transition metal oxide having an average particle diameter ($D_{50}$) of 8 μm or more, and a cobalt and boron-containing coating layer formed on the large particle lithium composite transition metal oxide.

Advantageous Effects

A method of preparing a lithium secondary battery according to the present invention may prepare a lithium secondary battery with improved output characteristics and high-temperature lifetime by compensating for a problem of irreversible capacity loss through a bimodal positive electrode material while using a high capacity silicon-based negative electrode active material.

BRIEF DESCRIPTION OF THE DRAWINGS

FIGURE is a scanning electron microscope (SEM) image by electron probe micro analyzer (EPMA) analysis of a cross section of a positive electrode prepared in Example 1.

DETAILED DESCRIPTION

Hereinafter, the present invention will be described in more detail to allow for a clearer understanding of the present invention.

In the present specification, the expression "average particle diameter ($D_{50}$)" may be defined as a particle diameter at a cumulative volume of 50% in a particle size distribution curve. The average particle diameter ($D_{50}$), for example, may be measured by using a laser diffraction method, and, specifically, after lithium composite transition metal oxide particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

A method of preparing a lithium secondary battery of the present invention includes steps (1) to (5) below.

(1) preparing a first positive electrode active material by mixing a small particle lithium composite transition metal oxide having an average particle diameter ($D_{50}$) of less than 7 μm with a boron-containing raw material and performing a heat treatment;

(2) preparing a second positive electrode active material by mixing a large particle lithium composite transition metal oxide having an average particle diameter ($D_{50}$) of 8 μm or more with a cobalt-containing raw material and a boron-containing raw material and performing a heat treatment;

(3) mixing the first positive electrode active material and the second positive electrode active material to prepare a positive electrode material having a bimodal particle diameter distribution;

(4) preparing a positive electrode by coating the positive electrode material on a positive electrode collector; and (5) assembling the positive electrode, a negative electrode including a silicon-based negative electrode active material, and a separator.

It is essential to use a silicon-based negative electrode active material having high capacity for the development of a high-capacity cell, but, since the silicon-based negative electrode active material has a low initial charge/discharge efficiency of less than 85%, there is a problem in that a lithium ion loss rate due to an irreversible reaction is high.

Also, in a case in which a positive electrode active material having high initial charge/discharge efficiency is used, since charge capacity of the cell is reduced, it is disadvantageous to achieve high energy.

Thus, loss of lithium ions may be reduced and energy may be increased by using a low-efficiency positive electrode active material capable of providing lithium to the silicon-based negative electrode active material during initial charge/discharge.

The method of preparing a lithium secondary battery according to the present invention provides a positive electrode material in which output is improved while consumption of lithium ions may be reduced due to low initial charge/discharge efficiency by applying boron (B) and cobalt (Co) composite coating.

Boron coating allows a LBO phase (lithium boron oxide phase) to be formed on a surface of the positive electrode active material, wherein the LBO phase has an effect of increasing capacity of the battery and reducing resistance due to its high ionic conductivity, and may suppress a side reaction between an electrolyte solution and a surface of the positive electrode due to its low electrical conductivity.

Cobalt coating allows a cobalt oxide ($Co_3O_4$) to be formed on the surface of the positive electrode active material during a heat treatment at a low temperature, wherein, as a result, discharge efficiency may be reduced and initial resistance may be increased.

With respect to the present invention, the efficiency may be reduced to be suitable for the silicon-based negative electrode active material without reducing resistance due to the complex coating of boron and cobalt, and output and lifetime may be improved in comparison to boron only coating.

Particularly, in the bimodal positive electrode active material composed of small particles and large particles, since cobalt coating is not applied to the small particles that significantly affect output performance due to their large specific surface area, but is applied only to the large particles with a relatively small specific surface area, a decrease in output and an increase in initial resistance due to cobalt oxide may be minimized.

Hereinafter, each step will be described in detail.

<Preparation of Positive Electrode Material>

In the preparing of the first positive electrode active material of the present invention, a small particle lithium composite transition metal oxide having an average particle diameter ($D_{50}$) of less than 7 μm is mixed with a boron-containing raw material and heat-treated.

The average particle diameter ($D_{50}$) of the small particle lithium composite transition metal oxide may be in a range of 2 μm or more to less than 7 μm, for example, 3 μm to 6 μm.

The boron-containing raw material may be at least one selected from $H_3BO_3$, $B_2O_3$, $B_4C$, $BF_3$, $(C_3H_7O)_3B$, $(C_6H_5O)_3B$, $[CH_3(CH_2)_3O]_3B$, $C_{13}H_{19}O_3$, $C_6H_5B(OH)_2$, and $B_2F_4$, may be preferably at least one selected from $H_3BO_3$ and $B_2O_3$, and may be more preferably $H_3BO_3$. Since $H_3BO_3$ has a lower melting point and better reactivity with lithium ions than other boron-containing raw materials, it may play a role in reducing an ambient reaction temperature, specifically, reducing a reaction temperature of a sintering additive that helps grain growth or a raw material with a high melting point. The same explanation applies to the boron-containing raw materials used in steps (1) and (2) of the present invention.

The boron-containing raw material in step (1) may be mixed in an amount of 0.05 to 0.13 parts by weight based on 1 part by weight of the small particle lithium composite transition metal oxide. In a case in which the amount of the boron-containing raw materials is 0.05 part by weight or more based on 1 part by weight of the small particle lithium composite transition metal oxide, since a LBO phase, which is a coating layer formed by contacting boron with a lithium by- product such as lithium hydroxide and lithium carbonate present on a surface of the positive electrode active material, is sufficiently formed, an effect of increasing capacity and decreasing resistance may be sufficiently achieved and a side reaction between an electrolyte solution and the surface of the positive electrode active material may be prevented, and, in a case in which the amount of the boron- containing raw materials is 0.13 part by weight or less based on 1 part by weight of the small particle lithium composite transition metal oxide, a phenomenon, in which the resistance is increased due to the formation of $B_2O_3$, a boron oxide, may be prevented. Specifically, in a case in which the amount of boron is increased to a range greater than the above range, since the amount of boron is greater than an amount of the lithium by-product capable of reacting to form the LBO phase, $B_2O_3$, as a boron oxide, in addition to LBO, is formed and acts as a resistor, and thus, it is undesirable in that the resistance may rather be increased.

The heat treatment of step (1) may be performed at 250° C. to 400° C., for example, 280° C. to 350° C. In a case in which the heat treatment temperature of step (1) is 250° C. or higher, it is desirable in that an unreacted boron source does not remain because the heat treatment temperature is sufficient as a temperature at which boron may react with the lithium by-product on the surface of the positive electrode active material, and, in a case in which the heat treatment temperature is 400° C. or lower, since the LBO phase is sufficiently formed, it may contribute to capacity improvement. In a case in which the heat treatment is performed at a temperature greater than 400° C., since the temperature is higher than an optimum temperature for the formation of the LBO phase, it is undesirable in that the capacity may rather be reduced.

The heat treatment of step (1) may be performed for 50 minutes to 500 minutes.

In the preparing of the second positive electrode active material of the present invention, a large particle lithium composite transition metal oxide having an average particle diameter ($D_{50}$) of 8 μm or more is mixed with a cobalt-containing raw material and a boron-containing raw material and heat-treated.

The average particle diameter ($D_{50}$) of the large particle lithium composite transition metal oxide may be in a range of 8 μm or more to 20 μm or less, for example, 9 μm to 16 μm.

An effect of increasing resistance and decreasing output may be minimized while reducing the initial charge/discharge efficiency of the positive electrode active material by not applying cobalt coating to the small particle lithium composite transition metal oxide, which has a large effect on output performance due to a large specific surface area because of its relatively small average particle diameter, but by applying the cobalt coating to the large particle lithium composite transition metal oxide having a relatively small specific surface area.

The mixings of steps (1) and (2) each may be dry mixing in which mixing is performed without a solvent.

The cobalt-containing raw material may be at least one selected from $Co_3O_4$, $Co(OH)_2$, $Co_2O_3$, $Co_3(PO_4)_2$, $CoF_3$, $Co(OCOCH_3)_2 \cdot 4H_2O$, $Co(NO_3) \cdot 6H_2O$, $Co(SO_4)_2 \cdot 7H_2O$, and $CoC_2O_4$, may be preferably at least one selected from $Co_3O_4$ and $Co(OH)_2$, and may be more preferably $Co(OH)_2$. Since $Co(OH)_2$ has a lower melting point than other cobalt-containing raw materials, there is an advantage in that it may achieve a sufficient cobalt coating effect even if it is heat-treated together at a temperature suitable for the boron-containing raw material having a lower reaction temperature than the cobalt-containing raw material.

The boron-containing raw material and the cobalt-containing raw material in step (2) of the present invention are $H_3BO_3$ and $Co(OH)_2$, respectively, and, in such a combination, there is an advantage in that the coating effect of boron and cobalt may be simultaneously achieved at a low temperature due to the relatively low melting point of the $Co(OH)_2$ as well as the effect of reducing the reaction temperature of the surrounding raw materials of the $H_3BO_3$.

In an embodiment of the present invention, coating raw material components of the first positive electrode active material and the second positive electrode active material are different from each other. Specifically, other coating raw materials other than the boron-containing raw material are not mixed in the preparing of the first positive electrode active material, and other coating raw materials other than the cobalt-containing raw material and the boron-containing raw material may not be mixed in the preparing of the second positive electrode active material.

The heat treatment of step (2) may be performed at 250° C. to 400° C., for example, 280° C. to 350° C. In a case in which the heat treatment temperature of step (2) is 250° C. or higher, it is desirable in that unreacted boron and cobalt do not remain because the heat treatment temperature is sufficient as a temperature at which the boron and cobalt sources may react, and, in a case in which the heat treatment temperature is 400° C. or lower, since the LBO phase is sufficiently formed, it may contribute to the capacity improvement. In a case in which the heat treatment is performed at a temperature greater than 400° C., since the temperature is higher than the optimum temperature for the formation of the LBO phase, it is undesirable in that the capacity may rather be reduced.

The heat treatment of step (2) may be performed for 50 minutes to 500 minutes.

The cobalt-containing raw material in step (2) may be mixed in an amount of 0.4 to 1.1 parts by weight based on 1 part by weight of the large particle lithium composite transition metal oxide. In a case in which the amount of the cobalt-containing raw materials is 0.4 part by weight or more based on 1 part by weight of the large particle lithium composite transition metal oxide, it is desirable in that cobalt oxide is sufficiently formed to sufficiently play a role in reducing efficiency of the positive electrode, and, in a case in which the amount of the cobalt-containing raw materials is 1.1 part by weight or less based on 1 part by weight of the large particle lithium composite transition metal oxide, cobalt oxide may be formed at an appropriate level on the surface of the positive electrode active material. In a case in which the cobalt oxide is excessively formed on the surface of the positive electrode active material, it may cause a decrease in capacity and an increase in resistance.

The boron-containing raw material in step (2) may be mixed in an amount of 0.05 to 0.13 parts by weight based on 1 part by weight of the large particle lithium composite transition metal oxide. In a case in which the amount of the boron-containing raw materials is 0.05 part by weight or more based on 1 part by weight of the large particle lithium composite transition metal oxide, since the LBO phase, which is a coating layer formed by contacting boron with the lithium by-product such as lithium hydroxide and lithium carbonate present on the surface of the positive electrode active material, is sufficiently formed, the effect of increasing capacity and decreasing resistance may be sufficiently achieved and the side reaction between the electrolyte solution and the surface of the positive electrode active material may be prevented, and, in a case in which the amount of the boron-containing raw materials is 0.13 part by weight or less based on 1 part by weight of the large particle lithium composite transition metal oxide, the phenomenon, in which the resistance is increased due to the formation of B203, a boron oxide, may be prevented. Specifically, in a case in which the amount of boron is increased to a range greater than the above range, since the amount of boron is greater than the amount of the lithium by-product capable of reacting to form the LBO phase, $B_2O_3$, as a boron oxide, in addition to the LBO, is formed and acts as a resistor, and thus, it is undesirable in that the resistance may rather be increased.

The lithium composite transition metal oxide in the present invention may be represented by Formula 1 below.

$$Li_{1+x}(Ni_aCo_bMn_cM_d)O_2 \qquad \text{[Formula 1]}$$

In Formula 1,

M is at least one selected from tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo), and x, a, b, c, and d satisfy $0 \le x \le 0.2$, $0.70 \le a < 1$, $0 < b \le 0.25$, $0 < c \le 0.25$, and $0 \le d \le 0.1$, respectively.

Preferably, M in Formula 1 may be Al.

Also, preferably, a, b, c, and d may be $0.70 \le a \le 0.90$, $0.05 \le b \le 0.25$, $0.05 \le c \le 0.25$, and $0 \le d \le 0.05$, for example, $0.80 \le a \le 0.90$, $0.05 \le b \le 0.15$, $0.05 \le c \le 0.15$, and $0 \le d \le 0.05$, respectively.

That is, in the lithium composite transition metal oxide, an amount of nickel (Ni) in a total amount of transition metals may be 70 mol % or more, for example, 80 mol % or more.

The method of preparing a lithium secondary battery of the present invention includes step (3) of mixing the first positive electrode active material and the second positive electrode active material, wherein the first positive electrode active material and the second positive electrode active material in step (3) may be mixed in a weight ratio of 10:90 to 40:60, for example, 15:85 to 30:70, and may be present in the same amount range in the prepared positive electrode material.

<Preparation of Positive Electrode>

In the preparing of the positive electrode of the present invention, the positive electrode material is coated on a positive electrode collector. This may be performed according to a conventional method of preparing a positive electrode except for using the above-described positive electrode material. Specifically, the positive electrode may be prepared by coating a positive electrode slurry including the above-described positive electrode material as well as optionally a binder and a conductive agent on the positive electrode collector, then drying, and rolling the coated positive electrode collector.

The positive electrode collector is not particularly limited as long as it has conductivity without causing adverse chemical changes in the battery, and, for example, stainless steel; aluminum; nickel; titanium; fired carbon; or aluminum or stainless steel that is surface-treated with one of carbon, nickel, titanium, silver, or the like may be used.

The solvent of the positive electrode slurry may be an organic solvent, such as N-methyl-2-pyrrolidone (NMP), and may be used in an amount such that desirable viscosity is obtained when the positive electrode material as well as optionally the binder and the conductive agent are included. For example, the solvent may be included in an amount such that a concentration of solid content in the positive electrode slurry is in a range of 10 wt % to 90 wt %, for example, 40 wt % to 85 wt %.

The binder in the positive electrode slurry is a component that assists in the binding between the positive electrode material and the conductive agent and in the binding with the current collector, wherein the binder is commonly added in an amount of 1 wt % to 30 wt % based on a total weight of the solid content in the positive electrode slurry. Examples of the binder may be polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene termonomer, a styrene-butadiene rubber, a fluorine rubber, or various copolymers thereof.

The conductive agent in the positive electrode slurry is a material providing conductivity without causing adverse chemical changes in the battery, wherein it may be added in an amount of 0.5 wt % to 20 wt % based on the total weight of the solid content in the positive electrode slurry.

A conductive material, such as: carbon black such as acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used as the conductive agent.

The positive electrode material may be included in an amount of 80 wt % to 99 wt %, for example, 90 wt % to 99 wt % based on the total weight of the solid content in the positive electrode slurry. In this case, when the amount of the positive electrode material is 80 wt % or less, since energy density is decreased, the capacity may be reduced.

<Preparation of Negative Electrode>

The negative electrode according to the present invention includes a silicon-based negative electrode active material, and may be prepared by coating a negative electrode collector with a negative electrode slurry including the negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The silicon-based negative electrode active material in the present invention may be at least one selected from silicon (Si), $SiO_x$ ($0<x<2$), and a Si—Y alloy (where Y is an element selected from alkali metal, alkaline earth metal, a Group 13 element, a Group 14 element, transition metal, a rare earth element, and a combination thereof, and is not Si), and may be preferably Si or SiO.

Since the silicon-based negative electrode active material has a capacity nearly 10 times higher than that of graphite, it may improve rapid charging performance of the battery by decreasing mass loading ($mg \cdot cm^{-2}$). However, there is a problem in that the lithium ion loss rate due to the irreversible reaction is high, wherein this problem may be solved by using the above-described positive electrode material.

The negative electrode of the present invention may further include a carbon-based negative electrode active material in addition to the silicon-based negative electrode active material. A carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon), hard carbon, mesophase pitch carbide, or fired cokes.

The silicon-based negative electrode active material in the present invention may be included in an amount of 1 wt % to 100 wt %, for example, 3 wt % to 10 wt % based on a total weight of the negative electrode active material.

The negative electrode active material may be included in an amount of 80 wt % to 99 wt % based on a total weight of solid content in the negative electrode slurry.

The binder is a component that assists in the binding between the conductive agent, the negative electrode active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer, a styrene-butadiene rubber, a fluorine rubber, or various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon black such as acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, or nickel powder; conductive whiskers such as zinc oxide whiskers or potassium titanate whiskers; conductive metal oxide such as titanium oxide; or polyphenylene derivatives, may be used.

The solvent of the negative electrode slurry may include water; or an organic solvent such as NMP and alcohol, and may be used in an amount such that desirable viscosity is obtained when the negative electrode active material, the binder, and the conductive agent are included. For example, the solvent may be included in an amount such that a concentration of the solid content in the negative electrode slurry including the negative electrode active material, the binder, and the conductive agent is in a range of 50 wt % to 75 wt %, for example, 50 wt % to 65 wt %.

<Preparation of Lithium Secondary Battery>

The method of preparing a lithium secondary battery of the present invention includes step (5) of assembling the positive electrode, the negative electrode including the silicon-based negative electrode active material, and a separator.

Specifically, in step (5), a separator is disposed between the above-described positive electrode and negative electrode, sequentially stacked, and dried to prepare an electrode assembly. Thereafter, a lithium secondary battery may be prepared by inserting the assembly into a case, injecting an electrolyte, and then sealing the case.

The separator separates the positive electrode and the negative electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or a combination thereof may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexamethylphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

<Lithium Secondary Battery>

A lithium secondary battery according to the present invention is a lithium secondary battery which includes:

- a positive electrode including a positive electrode material having a bimodal particle diameter distribution, a negative electrode including a silicon-based negative electrode active material, and a separator,
- wherein the positive electrode material includes a first positive electrode active material and a second positive electrode active material,
- wherein the first positive electrode active material includes a small particle lithium composite transition metal oxide having an average particle diameter ($D_{50}$) of less than 7 μm, and a boron-containing coating layer formed on the small particle lithium composite transition metal oxide, and
- the second positive electrode active material includes a large particle lithium composite transition metal oxide having an average particle diameter ($D_{50}$) of 8 μm or more, and a cobalt and boron-containing coating layer formed on the large particle lithium composite transition metal oxide.

The lithium secondary battery may be prepared according to the above-described method of preparing a lithium secondary battery, and each configuration may refer to the description of the above-described method of preparing a lithium secondary battery.

The coating layers included in the first positive electrode active material and the second positive electrode active material in the lithium secondary battery of the present invention may be confirmed by using an electron probe micro analyzer (EPMA).

In an embodiment of the present invention, constituent components of the coating layer of the first positive electrode active material and the coating layer of the second positive electrode active material are different from each other. Specifically, the coating layer of the first positive electrode active material is formed of boron, and the coating layer of the second positive electrode active material is formed of cobalt and boron.

The lithium secondary battery according to the present invention may be used in portable devices, such as mobile phones, notebook computers, and digital cameras, and electric cars such as hybrid electric vehicles (HEVs).

According to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains.

EXAMPLES AND COMPARATIVE EXAMPLES: PREPARATION OF POSITIVE ELECTRODE

Example 1

A lithium composite transition metal oxide represented by $Li(Ni_{0.8}Co_{0.1}Mn_{0.1})O_2$ ($D_{50}$=4 μm) and $H_3BO_3$ were dry mixed in a weight ratio of 1:0.05. The mixed mixture was heat-treated in an air atmosphere at 290° C. for 200 minutes to prepare a first positive electrode active material having a boron-containing coating layer formed thereon.

Separately, a lithium composite transition metal oxide represented by $Li(Ni_{0.8}Co_{0.1}Mn_{0.1})O_2$ ($D_{50}$=13 μm), $Co(OH)_2$, and $H_3BO_3$ were dry mixed in a weight ratio of 1:0.4:0.05. The mixed mixture was heat-treated in an air atmosphere at 290° C. for 200 minutes to prepare a second positive electrode active material having a cobalt and boron-containing coating layer formed thereon.

The first positive electrode active material and the second positive electrode active material were mixed in a weight ratio of 15:85 to prepare a bimodal positive electrode material.

The positive electrode material, a conductive agent (carbon black), and a binder (polyvinylidene fluoride, PVdF) were mixed in an N-methyl-2-pyrrolidone (NMP) solvent at a weight ratio of 97.5:1.0:1.5 to prepare a positive electrode slurry (solid content: 50 wt %). The positive electrode slurry was coated on one surface of an aluminum current collector, dried at 130° C., and then rolled to prepare a positive electrode.

FIGURE is a scanning electron microscope (SEM) image by electron probe micro analyzer (EPMA) analysis of a cross section of the positive electrode. A portion shown in green in FIGURE is a cobalt (Co) coating layer, and a peak shown in the image represents a Co concentration. It may be understood from FIGURE that the Co coating layer was formed only on large particles.

Example 2

A positive electrode was prepared in the same manner as in Example 1 except that an amount of $Co(OH)_2$ was increased so that the weight ratio of the lithium composite transition metal oxide, $Co(OH)_2$, and $H_3BO_3$ was 1:1.1:0.05 during the preparation of the second positive electrode active material in Example 1.

Example 3

A positive electrode was prepared in the same manner as in Example 1 except that an amount of $H_3BO_3$ was increased so that the weight ratio of the lithium composite transition metal to $H_3BO_3$ was 1:0.13 during the preparation of the first positive electrode active material in Example 1 and an amount of $H_3BO_3$ was increased so that the weight ratio of the lithium composite transition metal oxide, $Co(OH)_2$, and $H_3BO_3$ was 1:0.4:0.13 during the preparation of the second positive electrode active material in Example 1.

Comparative Example 1

A positive electrode was prepared in the same manner as in Example 1 except that a coating layer was not formed on both the first positive electrode active material and the second positive electrode active material in Example 1.

Comparative Example 2

A positive electrode was prepared in the same manner as in Example 1 except that only boron coating, and not cobalt coating, was performed during the formation of the coating layer of the second positive electrode active material in Example 1.

Comparative Example 3

A positive electrode was prepared in the same manner as in Example 1 except that a coating layer was not formed on the first positive electrode active material, and only cobalt coating, not boron coating, was performed during the formation of the coating layer of the second positive electrode active material.

Comparative Example 4

A positive electrode was prepared in the same manner as in Example 1 except that a cobalt and boron-containing coating layer was formed by adding $Co(OH)_2$ so that a weight ratio of the lithium composite transition metal oxide, $Co(OH)_2$, and $H_3BO_3$ was 1:0.4:0.05 during the formation of the coating layer of the first positive electrode active material in Example 1.

EXPERIMENTAL EXAMPLES

Experimental Example 1: Capacity and Initial Resistance Check

Each lithium secondary battery was prepared by preparing an electrode assembly by disposing a 15 μm thick polyethylene-based separator between each of the positive electrodes prepared in Examples 1 to 3 and Comparative Examples 1 to 4 and a lithium metal negative electrode, disposing the electrode assembly in a battery case, and then injecting an electrolyte solution into the case. In this case, the lithium secondary battery was prepared by injecting an electrolyte solution, in which 1 M $LiPF_6$ was dissolved in a mixed organic solvent in which ethylene carbonate (EC) and ethylmethyl carbonate (EMC) were mixed in a volume ratio of 1:2, as the electrolyte solution, and capacity and resistance during 0.1C charging and discharging of the lithium secondary battery were measured.

Specifically, the lithium secondary batteries respectively using the positive electrodes of Examples 1 to 3 and Comparative Examples 1 to 4 were charged at a constant current of 0.1 C to 4.25 V at 25° C. and cut-off charged at 0.05 C. Thereafter, each lithium secondary battery was discharged at a constant current of 0.1 C to a voltage of 3.0 V to measure initial charge/discharge capacity, initial resistance was measured by dividing a voltage drop during the first 10 seconds of discharge by a current value, and the results thereof are presented in Table 1 below.

TABLE 1

| The positive electrode used | Charge capacity (mAh/g) | Discharge capacity (mAh/g) | Efficiency (%) | Initial resistance (Ohm) |
|---|---|---|---|---|
| Example 1 | 229.0 | 198.1 | 86.5 | 26.5 |
| Example 2 | 226.1 | 194.1 | 85.8 | 40.7 |
| Example 3 | 225.9 | 193.7 | 85.7 | 30.2 |
| Comparative Example 1 | 225.2 | 202.9 | 90.1 | 45.7 |
| Comparative Example 2 | 229.2 | 211.3 | 92.2 | 26.3 |
| Comparative Example 3 | 224.9 | 188.2 | 83.7 | 60.9 |
| Comparative Example 4 | 224.6 | 191.4 | 85.2 | 51.3 |

Referring to Table 1, it may be confirmed that the batteries using the positive electrodes of Examples 1 to 3 had low initial resistance and low initial charge/discharge efficiency in combination with the lithium metal negative electrode. This means that it is advantageous in that lithium consumption may be reduced when used together with a silicon-based negative electrode active material having a high lithium ion loss rate. In contrast, since the positive electrode of Comparative Example 1, in which both small particles and large particles were not coated, and the positive electrode of Comparative Example 2, in which both small particles and large particles were subjected to boron only coating, had very high initial charge/discharge efficiency in combination with the lithium metal negative electrode, it may be expected that a lot of lithium ions will be lost when used together with the silicon-based negative electrode active material. With respect to the positive electrode of Comparative Example 3, in which small particles were not coated and only large particles were subjected to cobalt only coating, and the positive electrode of Comparative Example 4, in which both small particles and large particles were subjected to boron and cobalt coting, initial charge/discharge efficiency may be reduced, but it was confirmed that initial resistance was high.

Experimental Example 2: Output Resistance Characteristics Evaluation

Room-temperature output resistances of the lithium secondary batteries including the positive electrodes of Examples 1 to 3 and Comparative Examples 1 to 4 and a silicon-based negative electrode were measured.

Specifically, a negative electrode active material (composed of 3 wt % SiO and 97 wt % artificial graphite), a binder (SBR-CMC), and a conductive agent (carbon black) were added to water, as a solvent, at a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and roll-pressed to prepare the negative electrode.

Each lithium secondary battery was prepared by preparing an electrode assembly by disposing a 15 μm thick polyethylene-based separator between each of the positive electrodes prepared in Examples 1 to 3 and Comparative Examples 1 to 4 and the negative electrode, disposing the electrode assembly in a battery case, and then injecting an electrolyte solution into the case. In this case, the lithium secondary battery was prepared by injecting an electrolyte solution, in which 1 M $LiPF_6$ was dissolved in a mixed organic solvent in which ethylene carbonate (EC) and ethylmethyl carbonate (EMC) were mixed in a volume ratio of 1:2, as the electrolyte solution.

Each of the lithium secondary batteries was charged at 0.5 C to 4.2 V in a constant current-constant voltage (CCCV) mode at 25° C. and discharged at a constant current of 2.0 C for 30 seconds to measure output resistance with a voltage drop for 30 seconds, and the results thereof are presented in Table 2 below.

TABLE 2

| The positive electrode used | Room-temperature output resistance (Ohm) |
|---|---|
| Example 1 | 1.51 |
| Example 2 | 1.58 |
| Example 3 | 1.63 |
| Comparative Example 1 | 1.98 |
| Comparative Example 2 | 1.67 |
| Comparative Example 3 | 1.85 |
| Comparative Example 4 | 1.78 |

From the results of Table 2, it may be understood that the positive electrodes of Examples 1 to 3 had an effect of reducing the output resistance in combination with the negative electrode including the Si-based negative electrode active material.

Experimental Example 3: High-Temperature Life Characteristics Evaluation

High-temperature life characteristics of the lithium secondary batteries including the positive electrodes of Examples 1 to 3 and Comparative Examples 1 to 4 and a silicon-based negative electrode were measured.

Specifically, a negative electrode active material (composed of 3 wt % SiO and 97 wt % artificial graphite), a binder (SBR-CMC), and a conductive agent (carbon black) were added to water, as a solvent, at a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and then roll-pressed to prepare the negative electrode.

Each lithium secondary battery was prepared by preparing an electrode assembly by disposing a 15 μm thick polyethylene-based separator between each of the positive electrodes prepared in Examples 1 to 3 and Comparative Examples 1 to 4 and the negative electrode, disposing the electrode assembly in a battery case, and then injecting an electrolyte solution into the case. In this case, the lithium secondary battery was prepared by injecting an electrolyte solution, in which 1 M $LiPF_6$ was dissolved in a mixed organic solvent in which ethylene carbonate (EC) and ethylmethyl carbonate (EMC) was mixed in a volume ratio of 1:2, as the electrolyte solution.

Each of the lithium secondary batteries was charged at 0.5 C to 4.2 V in a CCCV mode at 45° C. and discharged at a constant current of 0.5 C to 3.0 V to measure a capacity retention and a resistance increase rate when 200 charge/discharge experiments were performed. The results thereof are presented in Table 3 below.

TABLE 3

| The positive electrode used | Capacity retention (%) | Resistance increase rate (%) |
|---|---|---|
| Example 1 | 93.4 | 115.6 |
| Example 2 | 92.9 | 121.5 |
| Example 3 | 91.8 | 128.9 |
| Comparative Example 1 | 87.1 | 171.2 |
| Comparative Example 2 | 91.2 | 131.4 |
| Comparative Example 3 | 88.5 | 154.2 |
| Comparative Example 4 | 89.3 | 148.9 |

From the results of Table 3, it may be confirmed that the positive electrodes of Examples 1 to 3 in combination with the negative electrode including the Si-based active material were more effective in increasing the capacity retention of the battery and reducing the resistance increase rate in a high-temperature environment than the positive electrodes of Comparative Examples 1 to 4.

Considering the results of the previous experiments, the lithium secondary battery according to an embodiment of the present invention had excellent output characteristics and high-temperature lifetime.

The invention claimed is:

1. A method of preparing a lithium secondary battery, comprising:

(1) preparing a first positive electrode active material by mixing a first lithium composite transition metal oxide having an average particle diameter (D50) of less than 7 μm with a first boron-containing raw material and performing a first heat treatment, wherein the first boron-containing raw material is mixed in an amount of 0.05 to 0.13 parts by weight based on 1 part by weight of the first lithium composite transition metal oxide;

(2) preparing a second positive electrode active material by mixing a second lithium composite transition metal oxide having an average particle diameter (D50) of 8 μm or more with a cobalt-containing raw material and a second boron-containing raw material and performing a second heat treatment, wherein the cobalt-containing raw material is mixed in an amount of 0.4 to 1.1 parts by weight based on 1 part by weight of the second lithium composite transition metal oxide, and the second boron-containing raw material is mixed in an amount of 0.05 to 0.13 parts by weight based on 1 part by weight of the second lithium composite transition metal oxide;

(3) mixing the first positive electrode active material and the second positive electrode active material to prepare a positive electrode material having a bimodal particle diameter distribution;

(4) preparing a positive electrode by coating the positive electrode material on a positive electrode collector; and (5) assembling the positive electrode, a negative electrode including a silicon-based negative electrode active material, and a separator.

2. The method of claim 1, wherein the first and second boron-containing raw material comprises at least one of $H_3BO_3$ or $B_2O_3$.

3. The method of claim 1, wherein the cobalt-containing raw material comprises at least one of $Co_3O_4$ or $Co(OH)_2$.

4. The method of claim 1, wherein the first heat treatment of step (1) is performed at 250° C. to 400° C.

5. The method of claim 1, wherein the second heat treatment of step (2) is performed at 250° C. to 400° C.

6. The method of claim 1, wherein the first positive electrode active material and the second positive electrode active material of step (3) are mixed in a weight ratio of 10:90 to 40:60.

7. The method of claim 1, wherein the lithium composite transition metal oxide is represented by Formula 1:

$$Li_{1+x}(Ni_aCo_bMn_cM_d)O_2 \quad \text{[Formula 1]}$$

wherein, in Formula 1,

M is at least one of W, Cu, Fe, V, Cr, Ti, Zr, Zn, Al, In, Ta, Y, La, Sr, Ga, Sc, Gd, Sm, Ca, Ce, Nb, Mg, B, or Mo, and x, a, b, c, and d satisfy $0 \leq x \leq 0.2$, $0.70 \leq a < 1$, $0 < b \leq 0.25$, $0 < c \leq 0.25$, and $0 \leq d \leq 0.1$, respectively.

8. The method of claim 1, wherein the silicon-based negative electrode active material is at least one of Si, $SiO_x$ ($0<x<2$), or a Si—Y alloy, wherein Y is at least one element of alkali metal, alkaline earth metal, a Group 13 element, a Group 14 element, transition metal, a rare earth element, or a combination thereof, and is not Si.

9. A lithium secondary battery comprising: a positive electrode including a positive electrode material having a bimodal particle diameter distribution, a negative electrode including a silicon-based negative electrode active material, and a separator, wherein the positive electrode material comprises a first positive electrode active material and a second positive electrode active material, wherein the first positive electrode active material comprises a first lithium composite transition metal oxide having an average particle diameter ($D_{50}$) of less than 7 μm, and a first boron-containing coating layer formed on the first lithium composite transition metal oxide, wherein the first boron-containing coating layer comprises a boron-containing material in an amount of 0.05 to 0.13 parts by weight based on 1 part by weight of the first lithium composite transition metal oxide; and the second positive electrode active material comprises a second lithium composite transition metal oxide having an average particle diameter (D50) of 8 μm or more, and a cobalt-containing and a second boron-containing coating layer formed on the second lithium composite transition metal oxide., wherein the cobalt-containing and the second boron-containing coating layer comprises a cobalt-containing material in an amount of 0.4 to 1.1 parts by weight based on 1 part by weight of the second lithium composite transition metal oxide, and a second boron-containing material in an amount of 0.05 to 0.13 parts by weight based on 1 part by weight of the second lithium composite transition metal oxide.

10. The lithium secondary battery of claim 9, wherein the first positive electrode active material and the second positive electrode active material are present in a weight ratio of 10:90 to 40:60.

11. The lithium secondary battery of claim 9, wherein, an amount of nickel in the first and second lithium composite transition metal oxide is 70 mol % or more.

12. The lithium secondary battery of claim 9, wherein the silicon-based negative electrode active material is at least one of Si, $SiO_x$ ($0<x<2$), or a Si—Y alloy, wherein Y is at least one element of alkali metal, alkaline earth metal, a Group 13 element, a Group 14 element, transition metal, a rare earth element, or a combination thereof, and is not Si.

* * * * *